(12) United States Patent
Steenbeek et al.

(10) Patent No.: US 12,459,583 B2
(45) Date of Patent: Nov. 4, 2025

(54) VEHICLE WITH BOTTOM STRUCTURE FOR REDUCING AERODYNAMIC RESISTANCE

(71) Applicant: Lightyear IPCo B.V., Helmond (NL)

(72) Inventors: Jorden David Steenbeek, Utrecht (NL); Annemiek Jeanine Koers, Nijmegen (NL); Federico García López, Eindhoven (NL)

(73) Assignee: Lightyear IPCo B.V., Helmond (NL)

( * ) Notice: Subject to any disclaimer, the term of this patent is extended or adjusted under 35 U.S.C. 154(b) by 305 days.

(21) Appl. No.: 18/009,562

(22) PCT Filed: Jun. 22, 2020

(86) PCT No.: PCT/EP2020/067317
§ 371 (c)(1),
(2) Date: Dec. 9, 2022

(87) PCT Pub. No.: WO2021/259445
PCT Pub. Date: Dec. 30, 2021

(65) Prior Publication Data
US 2023/0347994 A1  Nov. 2, 2023

(51) Int. Cl.
*B62D 35/02* (2006.01)
*B62D 25/20* (2006.01)
*B62D 37/02* (2006.01)

(52) U.S. Cl.
CPC ......... *B62D 35/02* (2013.01); *B62D 25/2027* (2013.01); *B62D 37/02* (2013.01)

(58) Field of Classification Search
CPC ......... Y02T 10/88; Y02T 10/82; B62D 37/02; B62D 35/02; B62D 35/00; B62D 25/2027; B62D 25/20
See application file for complete search history.

(56) References Cited

U.S. PATENT DOCUMENTS

| 4,772,062 A | 9/1988 | Janssen et al. |
| 5,947,548 A | 9/1999 | Carper et al. |
| 2007/0001481 A1 | 1/2007 | Breidenbach |
| 2009/0256386 A1 | 10/2009 | Wood |

(Continued)

FOREIGN PATENT DOCUMENTS

| CN | 107839770 A | 3/2018 |
| CN | 109911037 A | 6/2019 |
| CN | 209454882 U | 10/2019 |

(Continued)

OTHER PUBLICATIONS

Approach and departure angles Wikipedia (Year: 2019).*

(Continued)

*Primary Examiner* — Lori Lyjak
(74) *Attorney, Agent, or Firm* — Patterson + Sheridan, LLP

(57) ABSTRACT

Vehicle comprising a bottom structure arranged at a bottom rear side of the vehicle, wherein the vehicle is an automobile for use on public roads, wherein the bottom structure: comprises at least a vortex part which is inclined upwards when seen in a direction from a front end of the vehicle to a rear end of the vehicle, wherein the vortex part covers substantially the width of the vehicle, and is adapted to, when the vehicle is moving forward, generate an bottom air vortex below the vortex part.

16 Claims, 3 Drawing Sheets

(56) References Cited

U.S. PATENT DOCUMENTS

Figure 1A:
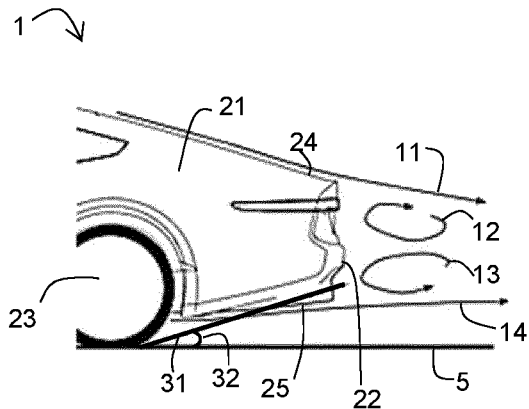

2011/0198886 A1    8/2011   Ilse et al.
2018/0261899 A1*  9/2018   Milton .............. H01M 10/6556

FOREIGN PATENT DOCUMENTS

| DE | 4102073 A1 | 7/1992 |
| --- | --- | --- |
| DE | 29721562 U1 | 2/1998 |
| DE | 102015004920 A1 | 10/2016 |
| DE | 102015016717 A1 | 3/2017 |
| GB | 2560759 A | 9/2018 |
| JP | 2006282076 A | 10/2006 |
| WO | 8301421 A1 | 4/1983 |
| WO | 2018041890 A1 | 3/2018 |

OTHER PUBLICATIONS

PCT International Search Report and Written Opinion dated Mar. 16, 2021, for International Application No. PCT/EP2020/067317.
Japanese Office Action dated Jun. 3, 2024, for Japanese Patent Application No. 2022-579082.
Chinese Office Action dated Mar. 31, 2025, for Chinese Patent Application 202080102345.1.
Korean Office Action dated Aug. 26, 2025, for Korean Patent Application No. 10-2023-7001412.

* cited by examiner

VEHICLE WITH BOTTOM STRUCTURE FOR REDUCING AERODYNAMIC RESISTANCE

The present invention relates to the technical field of vehicles, such as automobiles for use on public roads. In particular, the invention relates to the aerodynamics at the rear end of a vehicle, and a bottom structure for a vehicle.

The project leading to this application has received funding from the European Union's Horizon 2020 research and innovation program under grant agreement No. 848620.

In view of climate change and the effects of greenhouse gasses, it is desired that the consumption of fuels in vehicles be reduced. This may e.g. be achieved by reducing the aerodynamic resistance of the vehicle, e.g. by reducing the drag coefficient. Completely eliminating fossil fuels can be done by providing an electric vehicle, having an electric motor instead of an internal combustion engine. One of the fields for improvement with electric vehicles at the moment is their driving range before recharging of the battery is required. The driving range may also be improved by reducing the aerodynamic resistance of the vehicle.

It is known that for minimal aerodynamic resistance, the vehicle should have a teardrop-like shape. In practice, however, this is usually not completely possible because of practical issues and design constraints. For example, an automobile usually has a rear trunk which must provide sufficient space. Another example of a practical constraint is the departure angle. The departure angle must be large enough to ensure that sufficient ground clearance is provided for the vehicle to drive over non-flat surfaces, e.g. a hill, a speed bump, or hole in the ground.

It is an object of the invention to provide a vehicle of improved aerodynamics, e.g. reducing the aerodynamic resistance and/or drag coefficient, or at least to provide an alternative for known solutions.

One or more of the objects of the invention are achieved with a vehicle comprising a bottom structure arranged at a bottom rear side of the vehicle, wherein optionally the vehicle is an automobile e.g. for use on public roads. In accordance with the invention, the bottom structure:
- comprises at least a vortex part which is inclined upwards when seen in a direction from a front end of the vehicle to a rear end of the vehicle, wherein the vortex part optionally covers substantially the width of the vehicle,
- is adapted to, when the vehicle is moving forward, generate a bottom air vortex below the vortex part.

The invention thus relates to a vehicle. The vehicle may be an automobile, e.g. for use on public roads. The vehicle may e.g. be a passenger vehicle, being adapted for transporting multiple people, e.g. two, four, five, seven, or more people. The vehicle may be a cargo vehicle, being adapted to transport cargo. The vehicle may be an autonomous vehicle, e.g. an autonomous automobile or an automated guided vehicle adapted for application such as warehouses or outdoor terrains. The vehicle comprises an internal combustion engine for providing a propulsion force. The vehicle may comprise an electrical motor for providing a propulsion force. The vehicle may comprise one or more solar panels for charging a battery and/or for providing energy for an electrical motor. In general, the vehicle moves over a ground surface.

In the context of this document, terms such as "front", "rear", "bottom", "upper", "top", "inclined" are defined in accordance with a situation when the vehicle is moving forward on a horizontal surface and/or while the vehicle is arranged horizontally.

The vehicle comprises a bottom structure. The bottom structure is arranged at a bottom rear side of the vehicle. The bottom structure is e.g. arranged behind rear wheels of the vehicle when the vehicle comprises front wheels and rear wheels. The bottom structure may e.g. be arranged between the rear wheels and the rear end of the vehicle. Optionally, the vortex part extends until a rear end of the vehicle. The bottom structure is part of the bottom of the vehicle, meaning that there are no parts of the vehicle arranged between the bottom structure and a ground surface when the vehicle is arranged on a horizontal ground surface. The bottom structure may e.g. be part of an undertray.

The bottom structure comprises at least a vortex part. The vortex part is inclined upwards when seen in a first direction from a front end of the vehicle to a rear end of the vehicle. That is, a front end of the vortex part is arranged below a rear end of the vortex part. Between the front end and the rear end, the vortex part may e.g. have a variable inclination angle, e.g. the vortex part being curved. The vortex part optionally covers substantially the width of the vehicle. The vortex part ensures that the bottom structure of the vehicle is higher when seen closer towards the rear end of the vehicle. This can in particular be advantageous when the vehicle is required to manoeuvre on non-flat surfaces, such as a hill, a hole, or bump in the ground surface, a traffic bump. For example, when the vehicle comprises rear wheels, there is a risk that the bottom surface being arranged between said rear wheels and the rear end of the vehicle comes into contact with the ground surface on non-flat surfaces. Said contact may result in damage and/or unpleasant user experience. Because the vortex part of the bottom structure is inclined upwards, the risk of contact with the ground surface is reduced.

The bottom structure is adapted to, when the vehicle is moving forward, generate a bottom air vortex below the vortex part. When the vehicle is moving forward, air around the vehicle is moved. Air flows from the front end of the vehicle to the rear end of the vehicle when seen relative to the vehicle. A bottom air vortex is generated, e.g. by the effect that the shape of the bottom structure has on the flowing air. By generating the bottom air vortex, the aerodynamic resistance of the vehicle is reduced. This can be understood as follows. The inclination of the vortex part, in general, is a deviation from the theoretically desired teardrop shape. By generating the bottom air vortex below the vortex part, it is avoided that a bottom airflow follows the vortex part. The bottom airflow comprises surrounding air which flows below the vehicle towards a rear end of the vehicle while the vehicle is moving forward. The bottom airflow is separated from the bottom structure before the rear end of the vehicle and flows below the bottom air vortex. The bottom airflow follows a profile which resembled the teardrop shape more than the physical shape of the vehicle. An advantageous aerodynamic profile is provided. At the same time, an advantageous physical profile is provided with the vortex part being inclined, enabling the vehicle to manoeuvre on non-flat surfaces.

The bottom air vortex may be adapted to propagate in a second direction oriented substantially perpendicular to the first direction. For example, the bottom air vortex is adapted to propagate in a second direction towards a left and/or right side of the vehicle. For example, the air vortex is adapted to propagate tangential to the vehicle. It has been found that this is advantageous for the rest of the airflow below and behind the vehicle. It is noted that this is different from so-called "vortex-generators" which are e.g. known to be arranged on a roof of an automobile or wings of an airplane.

Said vortex-generators generate an air vortex which propagates in a driving or flying direction of the vehicle, i.e. in the first direction.

In embodiments, the bottom air vortex is oriented counter-clockwise when seen from a left side of the vehicle. The bottom air vortex is oriented clockwise when seen from a right side of the vehicle. At a bottom of the bottom air vortex, air is flowing towards a rear end of the vehicle, thereby improving the flow of the surrounding air in the bottom airflow towards the rear end. At a top of the bottom air vortex, air is flowing towards a front end of the vehicle, and may e.g. provide an advantageous friction force on the surface of the vortex part in the driving direction.

In embodiments, a departure line is defined as a virtual line of the vehicle from a ground level towards a rear end of the vehicle and tangent to a rear wheel. The bottom structure is arranged above said departure line, and the bottom air vortex exceeds said departure line. At least a part of the bottom air vortex is below said departure line. The departure line extends through the bottom air vortex. As such, the bottom airflow follows an aerodynamic profile which exceeds the departure line. In this embodiment, it is ensured that the physical profile of the bottom structure is advantageous for the vehicle to manoeuvre on a non-flat surface, while the bottom airflow flows via an advantageous aerodynamic profile. For example, the departure line may be a virtual line between the ground surface and a rear bottom end of the vehicle.

In embodiments, a departure angle is defined as an angle between a horizontal plane and the departure line, wherein the departure angle is at least 10 degrees. For example, the departure angle may be at least 15, 18, or 20 degrees. Said departure angles are e.g. suitable for an automobile for use on public roads. The departure angle may further be determined in function of the intended applications of the vehicle. For a vehicle intended for off-road applications the departure angle may e.g. be larger than for a vehicle intended for mostly driving on public roads.

In embodiments, the bottom structure further comprises an air guiding part wherein, when seen in a direction from a front end of the vehicle to a rear end of the vehicle the air guiding part is arranged before the vortex part. The air guiding part is adjoining the vortex part at a transition line. The air guiding part may e.g. be arranged between rear wheels of the vehicle and the vortex part. The air guiding part may be adapted to, when the vehicle is moving forward, guide the bottom airflow towards the vortex part. The transition line may be adapted to separate the bottom airflow from the bottom structure. Optionally, the air guiding part may comprise guiding elements for guiding the bottom airflow in accordance with a predetermined flow profile. Optionally, the air guiding part may comprise a material and/or a surface roughness which results in low friction between the bottom structure and the bottom airflow that is flowing over the air guiding part.

In embodiments, a transition angle between the air guiding part and the vortex part is at least 45 degrees at the transition line. For example, the transition angle may be at least 50, 60, or 75 degrees. The inventors have found that having a relatively large transition angle, helps generating the bottom air vortex below the vortex part and the separation of the bottom airflow from the bottom structure.

In embodiments, the air guiding part and the vortex part are adapted to guide a bottom airflow towards the transition line at an approach angle of 60-120 degrees with the transition line, e.g. 75-105 degrees with the transition line, e.g. substantially perpendicular to the transition line, when the vehicle is moving forward. For example, the air guiding part may be shaped and/or have guiding elements accordingly. For example, the vortex part may be shaped accordingly, e.g. a border of the vortex part corresponding with the transition line. The inventors have found that in general, the closer the approach angle is to 90 degrees, the larger the generated bottom air vortex is. Optionally, the approach angle may be closer to 90 degrees in a centre of the transition line than on a left part and/or a right part of the transition line, when seen in a direction of the width of the vehicle. This may allow generating a bottom air vortex that is larger below a centre of the vortex part than below a left part and/or a right part. Said left part and/or right part may be outer ends of the vortex part when seen in a direction of the width of the vehicle.

In embodiments, the vortex part is arranged at an average inclination angle and the air guiding part is arranged inclined at an average air guiding part inclination angle, wherein the average inclination angle is larger than the average air guiding part inclination angle. The average air guiding part inclination angle may e.g. be larger than zero degrees. The air guiding part may e.g. be arranged inclined upwards when seen in a direction from a front end of the vehicle to a rear end of the vehicle. The average inclination angle being larger than the average air guiding part inclination angle means that the vortex part is more inclined than the air guiding part. This may be advantageous for generating the bottom air vortex and separation of the bottom airflow.

In embodiments, the vortex part has a concave shape. In embodiments, the vortex part has a parabolic-like shape of hyperbolic-like shape. The inventors have found that these shapes help generating the bottom air vortex below the vortex part. Furthermore, the bottom air vortex may be substantially circular when seen from a side view, and in these embodiments, the shape of the vortex part allows the bottom air vortex to the at least partly fitted to the vortex part. This reduces friction between the bottom air vortex and the vortex part.

In embodiments, the bottom air vortex is larger below a centre of the vortex parts than below a left part and/or a right part of the vortex part. The left part and/or right part may e.g. be outer ends of the vortex parts when seen in a direction of the width of the vehicle. For example, having the bottom air vortex smaller close to the sides of the vehicle may reduce the effect of the bottom air vortex on surrounding air flowing at the sides of the vehicle, which may be advantageous for the overall aerodynamic profile and the aerodynamic resistance.

In embodiments, the bottom structure and/or the vehicle further comprises a diffuser arranged before the vortex part when seen in a direction from a front end of the vehicle to a rear end of the vehicle. For example, in embodiments wherein the bottom structure also comprises the air guiding part, the air guiding part may comprise the diffuser. The diffuser may be adapted to decelerate and/or expand a bottom airflow, such that integration of said airflow with other air, e.g. behind a rear end of the vehicle, is improved. The diffuser is preferably arranged adjacent to the vortex part. This allows to affect the bottom airflow just before it is separated from the bottom structure.

In embodiments, the vehicle is adapted to, when the vehicle is moving forward, generate at least one rear air vortex behind a rear end of the vehicle. Optionally, the vehicle is adapted to generate an upper rear vortex, e.g. being oriented clockwise when seen from a left side of the vehicle, and a lower rear vortex, e.g. being counter-oriented clockwise when seen from a left side of the vehicle. For example, the shape of the rear end of the vehicle may be adapted to generate the at least one rear air vortex. The at least one rear air vortex may be advantageous for guiding the bottom airflow and optionally an upper airflow behind the rear end of the vehicle.

In embodiments, the vehicle is an automobile comprising an electric motor as a propulsion source. The vehicle may e.g. comprise a battery for providing power to the electric motor. By providing the vehicle with the inventive bottom structure, a driving range before recharging of the battery is required may be increased. Furthermore, using an electric motor instead of an internal combustion engine omits the need for an exhaust at a bottom rear end of the vehicle. Said exhaust may otherwise negatively affect the design of the bottom structure and/or vortex part when seen from an aerodynamic standpoint. In addition, exhaust gasses and/or thermal energy emitted via said exhaust could negatively affect how the surrounding air flows at the rear end of the vehicle.

In embodiments, the vehicle comprises solar panels on a roof and/or upper rear side of the vehicle. The solar panels can e.g. be adapted to provide energy to an electric motor or a battery for an electric motor. When the vehicle comprises solar panels, it may be desired to have a relatively large surface on which the solar panels can be arranged, such that the solar energy captured by the solar panels can be optimized. This may result in a relatively long vehicle, having a relatively long rear length. The long rear length may cause problems when the vehicle is maneuvering over non-flat surfaces. At the same time, it may be desired to reduce the aerodynamic friction as much as possible to increase the driving range. The bottom structure according to the invention can as such be advantageous.

The invention further relates to a bottom structure for a vehicle, adapted to be arranged at a bottom rear side of the vehicle thereby forming a rear bottom of the vehicle. The bottom structure comprises at least a vortex part which is inclined upwards when seen in a direction from a front end of the vehicle to a rear end of the vehicle, when the bottom structure is arranged on the vehicle. Optionally, the vortex part covers substantially the width of the vehicle. The bottom structure is adapted to, when the vehicle is moving forward, generate a bottom air vortex below the vortex part. It will be appreciated that the bottom structure may optionally comprise any of the features or embodiments described herein.

Although explained herein with reference to a bottom structure of a vehicle, it will be appreciated that the invention can also be applied for other applications. The invention therefore relates to a vehicle comprising an outer structure arranged at an outer side of the vehicle. The vehicle may e.g. be an automobile for use on public roads. The outer structure: comprises at least a vortex part, wherein the vortex part has a concave, parabolic, or hyperbolic shape. The outer structure further comprises an air guiding part wherein, when seen in a direction from a front end of the vehicle to a rear end of the vehicle: the air guiding part is arranged before and adjoining the vortex part, and a transition angle between the air guiding part and the vortex part is at least 45 degrees, e.g. at least 60 degrees, at a transition line between the air guiding part and the vortex part. The outer structure is adapted to, when the vehicle is moving forward, generate an air vortex adjacent to the vortex part.

The invention also relates to an outer structure for a vehicle, adapted to be arranged at an outer side of the vehicle. The vehicle may e.g. be an automobile for use on public roads. The outer structure comprises at least a vortex part, wherein the vortex part has a concave, parabolic, or hyperbolic shape. The outer structure further comprises an air guiding part wherein, when seen in a direction from a front end of the vehicle to a rear end of the vehicle: the air guiding part is arranged before and adjoining the vortex part, and a transition angle between the air guiding part and the vortex part is at least 45 degrees, e.g. at least 60 degrees, at a transition line between the air guiding part and the vortex part. The outer structure is adapted to, when the vehicle is moving forward, generate an air vortex adjacent to the vortex part.

The outer structure may e.g. be arranged on an upper side, a left side, or a right side of the vehicle. The air vortex generated adjacent to the vortex part may be advantageous for reducing aerodynamic resistance when the vehicle is moving. It will be appreciated that any of the features or embodiments explained herein with reference to the bottom structure or vehicle comprising the bottom structure according to the invention, may equally be applied to outer structure or vehicle comprising the outer structure according to the invention.

The invention further relates to a method that achieves one or more of the objects of the present invention. The method may be performed using a vehicle or bottom structure according to the invention, but is not limited thereto. Nevertheless, any of the features explained herein with respect to the vehicle or bottom structure of the invention may be analogously applied to the method according to the invention, and vice versa. Features and definitions explained with respect to the vehicle or bottom structure the invention will be interpreted in the same way with respect to the method according to the invention, unless explicitly mentioned otherwise.

The invention relates to a method for operating a vehicle, wherein the vehicle comprises a bottom structure comprising at least a vortex part which is inclined upwards when seen in a direction from a front end of the vehicle to a rear end of the vehicle, wherein optionally the vortex part covers substantially the width of the vehicle. The method comprises the following steps: moving the vehicle forward; and while the vehicle is moving forward, generating a bottom air vortex below the vortex part of the bottom structure.

The invention is described below with reference to the figures. These figures serve as examples to illustrate the invention, and will not be construed as limiting the scope of the claims. In the different figures, like features are indicated by the like reference numerals.

Figure 1B:
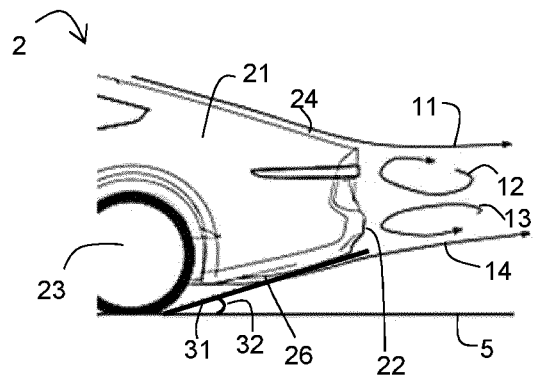
Figure 2:
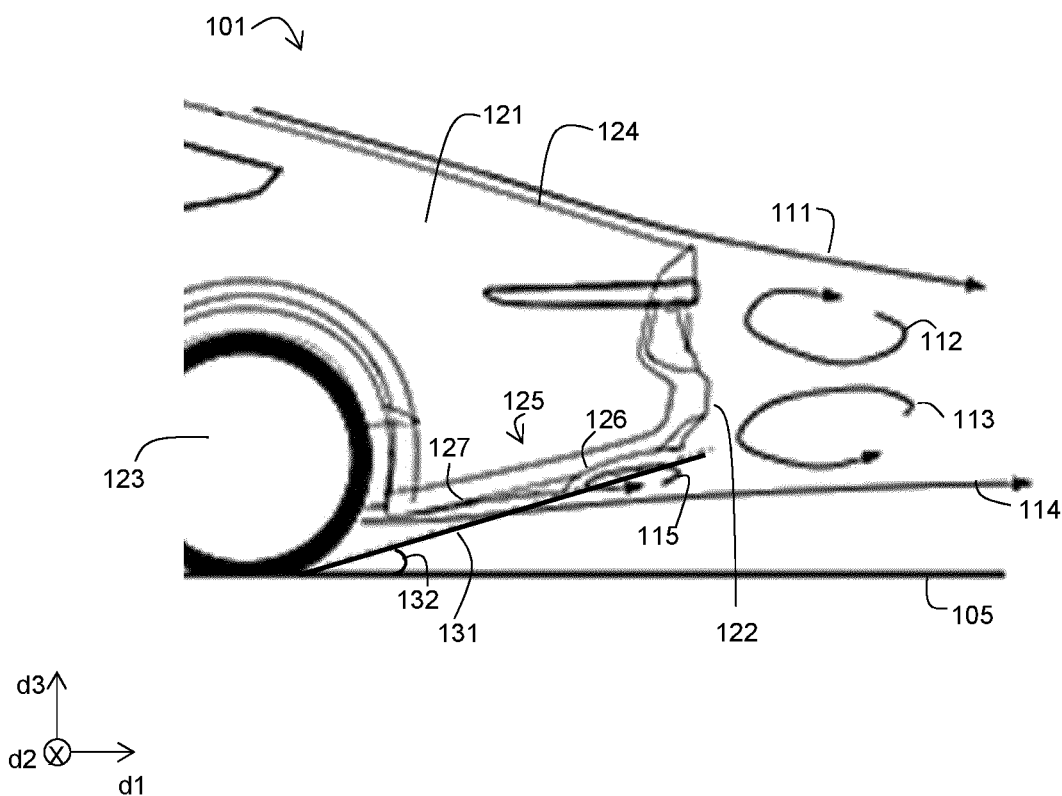
Figure 3:
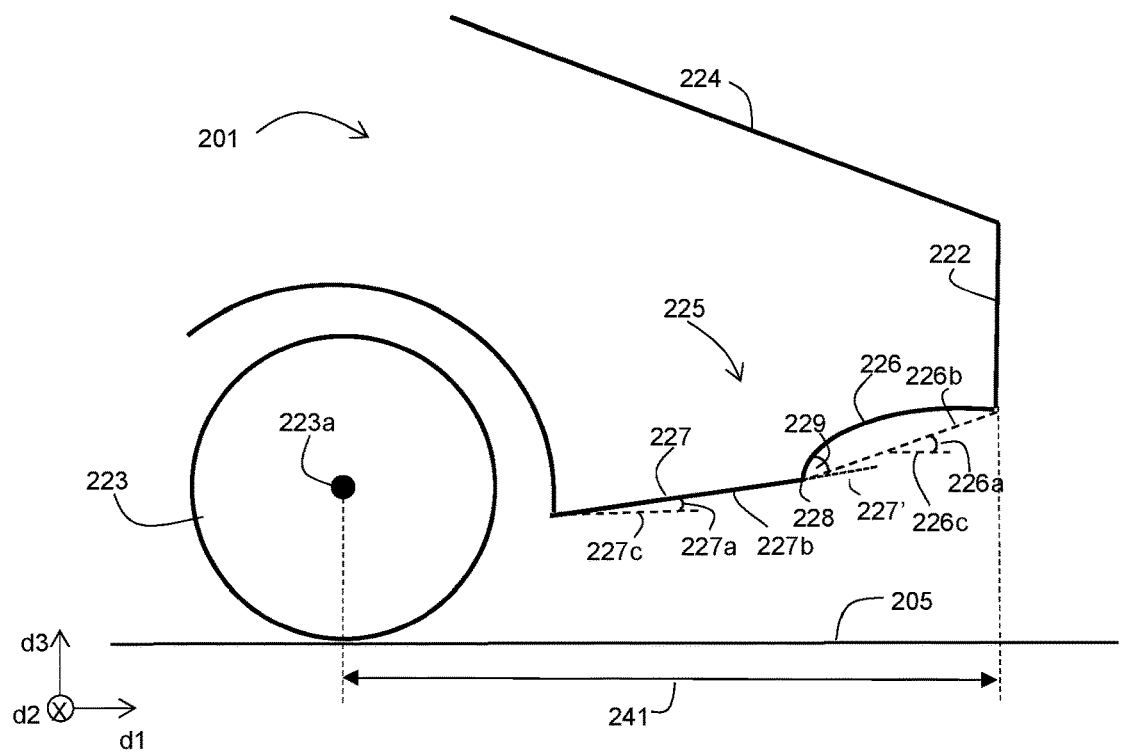
Figure 4A:
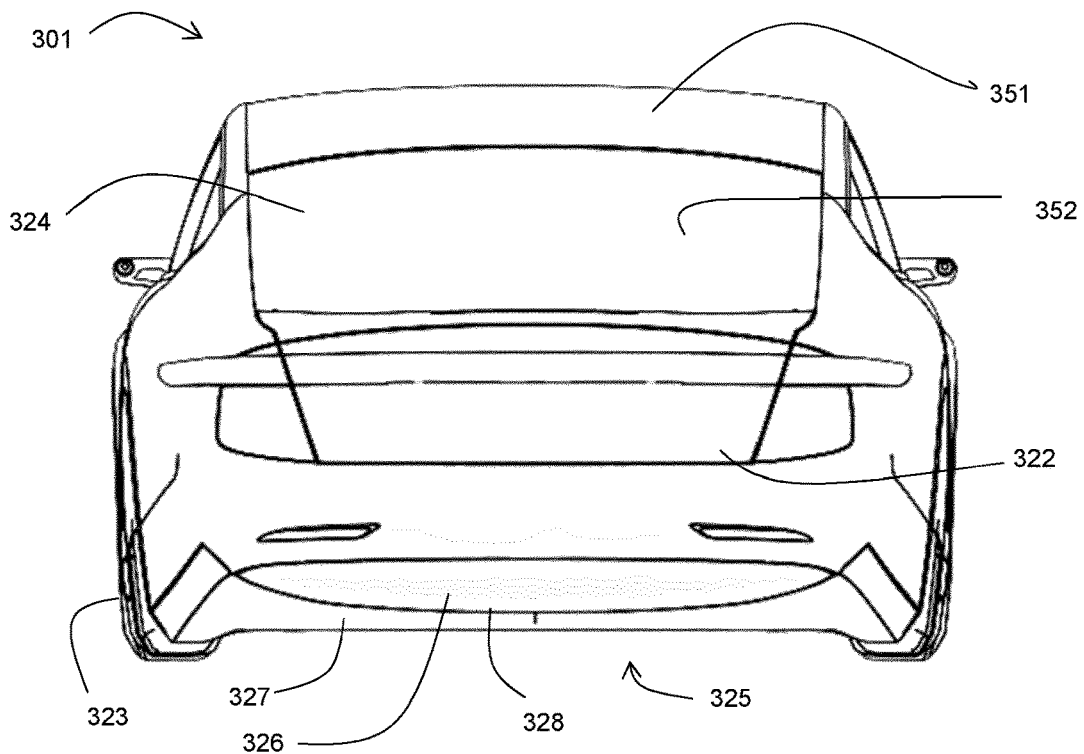
Figure 4B:
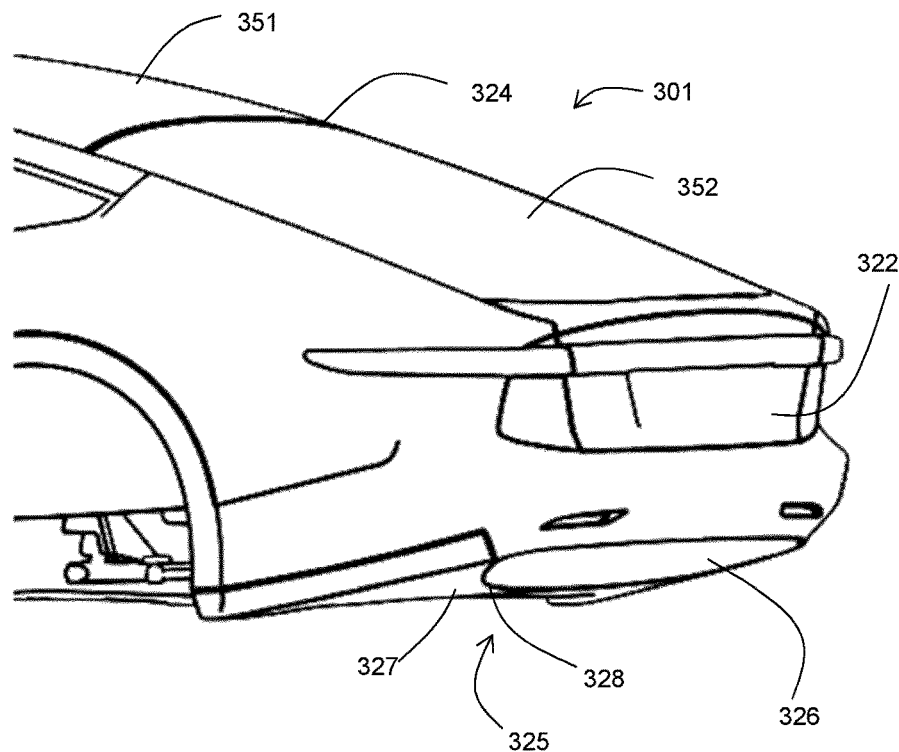
Figure 4C:
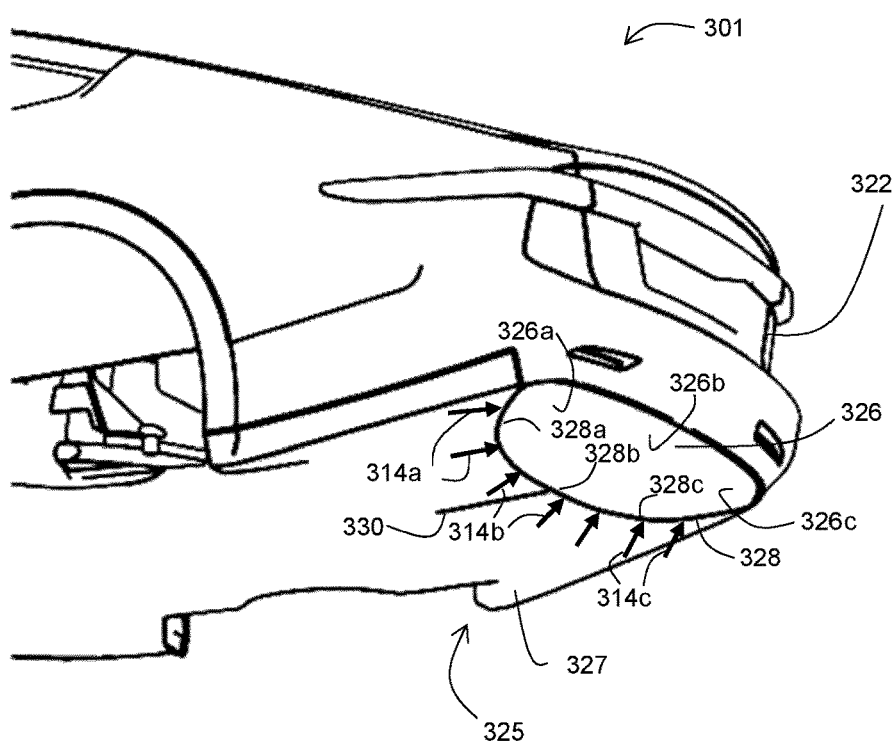

In the figures:

FIG. 1a: illustrates a vehicle violating a departure angle,

FIG. 1b: illustrates a vehicle illustrates possible negative effects of respecting a departure angle, FIG. 2: illustrates a first embodiment of the invention, FIG. 3: schematically illustrates a second embodiment of the invention, FIG. 4a-4c: illustrate a vehicle according to the invention from different views.

FIG. 1a illustrates a rear part 21 of vehicle 1 which is arranged on a ground surface 5, which in the shown situation is a horizontal surface. The vehicle 1 is an automobile for use on public roads. The vehicle 1 comprises an upper structure 24 and a bottom structure 25. The bottom structure 25 is arranged at a bottom rear side of the vehicle 1, between rear wheels 23 and a rear end 22.

An aerodynamic profile is illustrated by arrows 11, 12, 13, 14. The aerodynamic profile illustrates how air is moving when the vehicle 1 is moving forward. It will be appreciated that aerodynamic profiles as shown in the figures are simplified for the sake of clarity. The aerodynamic profile includes an upper airflow 11 and a bottom airflow 14, in which surrounding air flows in the direction indicated by the arrows 11, 14, respectively, in FIG. 1a. The upper airflow 11 follows the upper structure 24 of the vehicle 1 until the rear end 22 of the vehicle 1. The bottom airflow 14 follows the bottom structure 25 of the vehicle 1 until the rear end 22 of the vehicle 1. At the rear end 22 of the vehicle 1, the upper airflow 11 and the bottom airflow 14 are separated from the vehicle 1.

In order to minimize aerodynamic resistance and drag, it is desired that the aerodynamic profile resembles a teardrop shape. At the rear part 21 of the vehicle 1, this means that the upper airflow 11 and the bottom airflow 14 should converge towards each other as smoothly as possible. The upper structure 24 and the bottom structure 25 are arranged to direct the upper airflow 11 and the bottom airflow 14 to converge smoothly towards each other.

Behind the rear end 22 of the vehicle 1, the aerodynamic profile further includes an upper rear vortex 12 and a lower rear vortex 13. In the upper and lower rear vortices 12, 13 air flows in the direction indicated by the arrows 12, 13, respectively, in FIG. 1a. The upper and lower rear vortices 12, 13 may e.g. be formed because of the shape of the rear end 22 of the vehicle 1. The upper rear vortex 12 causes the upper airflow 11 to flow above the upper rear vortex 11, thereby substantially following the direction that the upper airflow 11 was following above the upper structure 24. The lower rear vortex 12 causes the bottom airflow 11 to flow below the lower rear vortex 11, thereby substantially following the direction that the lower airflow 11 was following below the bottom structure 25. The aerodynamic profile of the vehicle 1 shown in FIG. 1a is relatively advantageous, having relatively little aerodynamic friction and a low drag-coefficient.

Besides the aerodynamic profile, another requirement for the design of the rear part 21 of the vehicle 1 is a desired departure angle 32. The desired departure angle 32 is the angle between a desired departure line 31 and a horizontal surface, in this case the ground surface 5. The desired departure line 31 is a virtual line which is tangent to the rear wheel 23 and directed towards the rear end 22 of the vehicle 1. The desired departure angle 32 and the desired departure line 31 are defined in function of the envisaged applications of the vehicle 1, in particular the non-flat surfaces on which the vehicle 1 should be able to manoeuvre. For example, since the vehicle 1 is an automobile for use on public roads, the vehicle 1 must be able to drive over speed bumps and be able to drive in and out of parking garages. The desired departure angle 32 can therefore be 10-20 degrees. In case the vehicle 1 is envisaged to drive on off-road surfaces, the desired departure angle 32 may be chosen larger. In case the vehicle 1 is intended to drive on race circuits, the desired departure angle 32 may be chosen smaller. To make sure that the bottom structure 25 does not come into contact with the non-flat surfaces, the bottom structure 25 should be above the desired departure line 31. As can be seen, this is not the case for the vehicle 1 shown in FIG. 1a.

FIG. 1b shows a vehicle 2 with a bottom structure 26 which is above the desired departure line 31. The other features of the vehicle 2 correspond with those of the vehicle 1 shown in FIG. 1a, and therefore indicated with the same reference numerals in FIG. 1b. To ensure that the bottom structure 26 is above the desired departure line 31, the bottom structure 26 is inclined more upwards in comparison to the bottom structure 25 is FIG. 1a. As can be seen in FIG. 1b, the bottom airflow 14 again follows the bottom structure 26 until the rear end 22 of the vehicle 2, which now is in a direction inclined more upwards. In addition, because the bottom structure 26 is higher at the rear end 22, the lower air vortex 13 is arranged higher in comparison to FIG. 1a. This affects the higher air vortex 12 and the upper airflow 11 in FIG. 1b. As can be seen, the aerodynamic profile in FIG. 1b does not resemble a teardrop shape as much as the aerodynamic profile in FIG. 1a. In particular, the bottom airflow 14 in FIG. 1b inclines upwards where the bottom structure 26 starts inclining upwards, and the upper airflow 11 inclines upwards at the rear end 22 of the vehicle 2. This increases the downforce of the vehicle and increases the drag. The aerodynamic profile of the vehicle 2 shown in FIG. 1b results in relatively poor pressure recovery behind the vehicle which results in a low aerodynamic pressure behind the vehicle and therefore a high drag-coefficient.

As is apparent from the above explanation, the aerodynamic resistance and the departure angle may result in conflicting design requirements for the vehicle. The inventors have found a way to meet the conflicting requirements, or at least provide an alternative. FIG. 2 shows a rear part 121 of a vehicle 101 in accordance with a first embodiment of the invention. The vehicle 101 is arranged on a ground surface 105, which in the shown situation is a horizontal surface. The vehicle 101 is an automobile for use on public roads. The vehicle 1 comprises an upper structure 124 and a bottom structure 125. The bottom structure 125 is arranged at a bottom rear side of the vehicle 101, between rear wheels 123 and a rear end 122.

The bottom structure 125 comprises a vortex part 126. The vortex part 126 is inclined upwards when seen in a first direction d1. The first direction d1 is defined as a horizontal direction from a front end of the vehicle 101 to the rear end 122 of the vehicle 101. Although not visible, the vortex part 126 covers substantially the width of the vehicle 101. The width is defined in a second direction d2, which is a horizontal direction perpendicular to the first direction d1. The bottom structure 125 forms the bottom of the vehicle 101, meaning that there are no components of the vehicle 101 between the ground surface 105 and the vehicle 101 when seen a third direction d3 which is a vertical direction.

FIG. 2 further shows a departure line 131. The departure line 131 is defined as a virtual line from a ground level 105 towards the rear end 122 of the vehicle 101 and tangent to the rear wheel 123. A departure angle 132 is defined as an angle between a horizontal plane and the departure line 132. The departure angle is at least 10 degrees. The vortex part 126 of the bottom structure 126 is arranged above the departure line 132. The vehicle 101 thus satisfies the departure angle 132, and the bottom structure 125 will not come into contact with a ground surface when the vehicle 101 manoeuvres over intended non-flat surfaces.

The bottom structure 125 is adapted to generate a bottom air vortex 115 when the vehicle 101 is moving forward. The bottom air vortex 115 is located below the vortex part 126 of the bottom structure 125. In the bottom air vortex 115, air flows in the direction of arrow 115. An aerodynamic profile of the vehicle 101 thus includes an upper airflow 111, a bottom airflow 114, an upper rear vortex 112, a lower rear vortex 113, and the bottom air vortex 115. The bottom airflow 114 follows the bottom structure 125 along an air guiding part 127 which is arranged before the vortex part 126. Below the vortex part 126, the bottom air vortex 115 causes the bottom airflow 114 to no longer follow the bottom structure 125. Instead, the bottom airflow 114 is separated from the bottom structure 125 before the rear end 122 of the vehicle 101. The bottom airflow 114 flows below the bottom air vortex 115. The resulting aerodynamic profile resembles the aerodynamic profile shown in FIG. 1*a*, but the vehicle 101 shown in FIG. 2 satisfies the departure angle 132. Furthermore, the bottom air vortex 115 may exceed the departure line 131, as can be seen in FIG. 2. The departure line 131 extends through the bottom air vortex 115. The bottom airflow 114 therefore flows as if the bottom structure 125 would exceed the departure line 131.

When seen from the left side view in FIG. 2, the bottom air vortex 115 is oriented counter-clockwise. The air in the bottom air vortex 115 is rotating counter-clockwise. At a bottom of the bottom air vortex 115, the air flows substantially in the same direction as the bottom airflow 114, which is in the first direction d1. As such, friction between the bottom airflow 114 and the bottom air vortex 115 is relatively low. At a top of the bottom air vortex 115, the air substantially flows in a propulsion direction of the vehicle 101, which is in a direction oriented opposite of the first direction d1. Any friction between the bottom air vortex 115 and the vortex part 126 at the top of the bottom air vortex 115 results in a friction force on the vehicle 101 which is directed in the prolusion direction of the vehicle 101.

The bottom air vortex 115 propagates in a second direction d2, which is a horizontal direction perpendicular to the first direction d1. The second direction d2 is towards a left side or a right side of the vehicle 101. The bottom air vortex 115 is thus oriented tangential to the vehicle 101.

FIG. 3 shows a schematic representation of a vehicle 201 in a second embodiment in accordance with the invention. The vehicle 201 is arranged on a ground surface 205, and comprises an upper structure 224 and a bottom structure 225. The bottom structure 225 is arranged between a rear wheel 223 and a rear end 222 of the vehicle 201. The bottom structure 225 comprises a vortex part 226 and an air guiding part 227. When the vehicle 201 is moving forward, the bottom structure 225 is adapted to generate a bottom air vortex (not shown for clarity) below the vortex part 226. The air guiding part 227 is arranged before the vortex part 226 when seen a first direction d1 from a front end of the vehicle 201 to the rear end 222 of the vehicle 201. The air guiding part 227 and the vortex part 226 are adjoining in a transition line 228, which in the side view of FIG. 3 extends in a direction perpendicular to the paper. A transition angle 229 can be defined, representing the transition of the bottom structure 225 from the air guiding part 227 into the vortex part 226. The transition angle 229 is the angle between a virtual extension line 227' and the vortex part 226 at the transition line 228. The virtual extension line 227' extends in the direction that the air guiding part 227 extends up to the transition line 228. The transition angle 229 is at least 45 degrees, preferably at least 60 degrees. Having a relatively large transition angle 229 help generating the bottom air vortex below the vortex part 226 and helps separation of a bottom airflow from the bottom structure 225.

The vortex part 226 has a concave shape. This allows the bottom air vortex to be arranged below the vortex part 226 and at least partly follow the shape of the vortex part 226. This helps generating the bottom air vortex, and decreases aerodynamic friction when the bottom air vortex is present. The vortex part may e.g. have a parabolic-like shape of hyperbolic-like shape.

FIG. 3 further shows that the vortex part 226 is inclined upwards at an average inclination angle 226*a*. A virtual average inclination line 226*b* can be defined between the transition line 228 and a rear end of the vortex part 226. In FIG. 3, the rear end of the vortex part 226 is arranged at the rear end 222 of the vehicle 201. The average inclination angle 226*a* is defined as the angle between the average inclination line 226*b* and a horizontal line 226*c*.

In the embodiment shown in FIG. 3, the air guiding part 227 is also inclined upwards. A virtual average air guiding part inclination line 227*b* can be defined between a front end of the air guiding part 227 and the transition line 228. In the situation shown in FIG. 3, the average air guiding part inclination line 227*b* corresponds with the air guiding part 227 when seen in the side view in FIG. 3, because the air guiding part 227 is a flat structure that is arranged inclined. In other embodiments, it is possible that the air guiding part 227 is a concave or convex structure, which may e.g. be determined in function of a desired downforce. An average air guiding part inclination angle 227*a* can be defined between the average air guiding part inclination line 227*b* and a horizontal line 227*c*. The average air guiding part inclination angle 227*a* is smaller than the average inclination angle 226*a*.

FIG. 4*a*-4*c* show a vehicle 301 in a third embodiment of a vehicle 301 in accordance with the invention. FIG. 4*a* shows a rear view, FIG. 4*b* a rear perspective view, and FIG. 4*c* a bottom-rear perspective view. The vehicle 301 comprises an upper structure 324 and a bottom structure 325. The bottom structure 325 is arranged between a rear wheel 323 (visible in FIG. 4*a*) and a rear end 322 of the vehicle 301. The bottom structure 325 comprises a vortex part 326 and an air guiding part 327. Below the vortex part 325, a bottom air vortex (not shown for clarity) is generated when the vehicle 301 is moving forward. The air guiding part 327 is adjoining to the vortex part 326 at a transition line 328. A transition angle between the air guiding part 327 and the vortex part 326 at the transition line 328 is at least 45 degrees, preferably at least 60 degrees.

In FIG. 4*c*, it is indicated that the transition line 328 comprises a left part 328*a*, a centre part 328*b*, and a right part 328*c*. The centre part 328*b* extends substantially in a direction from a left side of the vehicle 301 to a right side of the vehicle 301. The left part 328*a* and the right part 328*c* of the transition line 328 are partly curved, and extend partly towards the rear end 322 of the vehicle 301.

A part of a bottom airflow 314*a*, 314*b*, 314*c* leading up to the transition line 328 is indicated with arrows 314*a*, 314*b*, 314*c*. The bottom airflow 314*a*, 314*b*, 314*c* comprises air that flows below the vehicle 301 from a front end of the vehicle 301 to the rear end 322 of the vehicle 301. Below the bottom structure 325, the bottom airflow 314*a*, 314*b*, 314*c* substantially follows the air guiding part 327 up to the transition line 328. Below the vortex part 326, the bottom air vortex is generated. The bottom airflow 314*a*, 314*b*, 314*c* is separated from the bottom structure 325 at the transition line 325 and flows below the bottom air vortex.

At the transition line 328, an approach angle can be defined. The approach angle is the angle at which the bottom airflow 314*a*, 314*b*, 314*c* approaches the transition line 328. The approach angle is dependent on how the bottom airflow 314*a*, 314*b*, 314*c* is guided below the air guiding part 327, and the shape of the transition line 328. In general, the closer the approach angle is to 90 degrees, the larger the bottom air vortex generated below the vortex part 326 is. The air guiding part 327 and the vortex part 326, and as such the transition line 328, are therefore designed such that the approach angle is 60-120 degrees.

At the centre part 328*b* of the transition line 328, a centre part 314*b* of the bottom airflow is guided towards the transition line 328 substantially perpendicular to the transition line 328. At the curved left part 328*a* and the right part 328*c* of the transition line 328 where a left part 314*a* and a right part 314c, respectively, approach the transition, line 328, the approach angle deviates further from 90 degrees. The bottom air vortex is therefore larger below a centre part 326b of the vortex part 326 than below a left part 326a and a right part 326c of the vortex part 326. The effect of the bottom air vortex on side airflows comprising air flowing on the left side and the right side of the vehicle 301 is therefore reduced.

FIG. 4c further shows that the bottom structure 325 comprises a diffuser 330. The diffuser 330 improves integration of bottom airflow 314a, 314b, 314c, with other airflows behind the rear end 322 of the vehicle 301.

The vehicle 301 shown in FIG. 4a-4c is an electric automobile, comprising an electric motor as propulsions source. Due to the bottom structure 325, the driving range of the vehicle 301 is improved. In addition, no exhaust is required at the rear end 322 of the vehicle 301 for emitting exhaust gases of an internal combustion engine. The bottom structure 325, in particular the vortex part 326, can be designed without having to consider the exhaust. Furthermore, the exhaust gasses could negatively affect the airflow behind the vehicle.

The upper structure 324 of the vehicle comprises a roof 351 and an upper rear side 352. The upper rear side 352 may in some embodiments be a window. In some embodiments, solar panels may be arranged on the roof 351 and/or the upper rear side 352. The solar panels can be used to provide energy for the electric motor, e.g. to a battery.

FIG. 3 illustrates that a rear length 241 of the vehicle 201 may be defined as a distance between an axis 223a of the rear wheels 223a and the rear end 222 of the vehicle 201. The rear length 241 is relatively long. As the rear length 241 of the vehicle 201 increases, it is more likely that the departure angle is violated. On the other hand, a greater rear length 241 may be advantageous for the aerodynamic profile, and may e.g. provide more space for arranging solar panels. The present invention is helpful to meet such conflicting requirements.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

A single processor or other unit may fulfil the functions of several items recited in the description and claims, e.g. of control units. Any communication between features can be wired or wireless according to known methods.

The method according to the invention may be implemented as a program, computer program or software application, or the like. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

The invention claimed is:

1. A vehicle comprising a bottom structure arranged at a bottom rear side of the vehicle, wherein the vehicle is an automobile for use on public roads, wherein the bottom structure:
   comprises at least a vortex part which is inclined upwards when seen in a direction from a front end of the vehicle to a rear end of the vehicle,
   is adapted to, when the vehicle is moving forward, generate a bottom air vortex below the vortex part,
and wherein a departure line is defined as a virtual line from a ground level towards a rear end of the vehicle and tangent to a rear wheel,
wherein:
   the bottom structure is arranged above said departure line, and
   the bottom air vortex exceeds said departure line.

2. The vehicle according to claim 1, wherein the bottom air vortex may adapted to propagate in a second direction oriented substantially perpendicular to the first direction.

3. The vehicle according to claim 1, wherein the bottom air vortex is oriented counter-clockwise when seen from a left side of the vehicle.

4. The vehicle according to claim 1, wherein a departure angle is defined as an angle between a horizontal plane and the departure line, wherein the departure angle is at least 10 degrees.

5. The vehicle according to claim 1, wherein the bottom structure further comprises an air guiding part wherein, when seen in a direction from a front end of the vehicle to a rear end of the vehicle:
   the air guiding part is arranged before and adjoining the vortex part at a transition line,
   a transition angle between the air guiding part and the vortex part is at least 45 degrees at the transition line.

6. The vehicle according to claim 5, wherein the air guiding part and the vortex part are adapted to guide a bottom airflow towards the transition line at an approach angle of 60-120 degrees with the transition line.

7. The vehicle according to claim 5, wherein the vortex part is arranged at an average inclination angle and the air guiding part is arranged inclined at an average air guiding part inclination angle, wherein the average inclination angle is larger than the average air guiding part inclination angle.

8. The vehicle according to claim 1, wherein the vortex part has a concave shape.

9. The vehicle according to claim 1, wherein the vortex part has a parabolic-like shape or hyperbolic-like shape.

10. The vehicle according to claim 1, wherein the bottom air vortex that is larger below a centre of the vortex part than below a left part and/or a right part of the vortex part, being outer ends of the vortex part when seen in a direction of the width of the vehicle.

11. The vehicle according to claim 1, further comprising a diffuser arranged before the vortex part when seen in a direction from a front end of the vehicle to a rear end of the vehicle.

12. The vehicle according to claim 1, wherein the vehicle is an automobile comprising an electric motor as a propulsion source.

13. The vehicle according to claim 1, wherein the vehicle comprises solar panels on a roof and/or upper rear side of the vehicle.

14. A bottom structure for a vehicle, adapted to be arranged at a bottom rear side of the vehicle thereby forming a rear bottom of the vehicle, wherein the bottom structure:
  comprises at least a vortex part which is inclined upwards when seen in a direction from a front end of the vehicle to a rear end of the vehicle, when the bottom structure is arranged on the vehicle,
  and is adapted to, when the vehicle is moving forward, generate a bottom air vortex below the vortex part,
and wherein a departure line is defined as a virtual line from a ground level towards a rear end of the vehicle and tangent to a rear wheel,
wherein:
  the bottom structure is adapted to be arranged above said departure line, and
  the bottom air vortex exceeds said departure line.

15. A vehicle comprising an outer structure arranged at an outer side of the vehicle, wherein the vehicle is an automobile for use on public roads, wherein the outer structure:
  comprises at least a vortex part, wherein the vortex part has a concave, parabolic, or hyperbolic shape, comprises an air guiding part wherein, when seen in a direction from a front end of the vehicle to a rear end of the vehicle:
   i. the air guiding part is arranged before and adjoining the vortex part, and
   ii. a transition angle between the air guiding part and the vortex part is at least 45 degrees at a transition line between the air guiding part and the vortex part,
  is adapted to, when the vehicle is moving forward, generate an air vortex adjacent to the vortex part,
and wherein a departure line is defined as a virtual line from a ground level towards a rear end of the vehicle and tangent to a rear wheel,
wherein:
  the outer structure is adapted to be arranged above said departure line, and
  the air vortex exceeds said departure line.

16. A method for operating a vehicle, wherein the vehicle comprises a bottom structure comprising at least a vortex part which is inclined upwards when seen in a direction from a front end of the vehicle to a rear end of the vehicle, wherein the method comprises the following steps:
  moving the vehicle forward,
  while the vehicle is moving forward, generating a bottom air vortex below the vortex part of the bottom structure,
wherein a departure line is defined as a virtual line from a ground level towards a rear end of the vehicle and tangent to a rear wheel,
wherein:
  the bottom structure is adapted to be arranged above said departure line, and
  the bottom air vortex exceeds said departure line.

* * * * *